W. E. PHINNEY.
ARTIFICIAL BAIT.
APPLICATION FILED SEPT. 7, 1916.
1,239,956.
Patented Sept. 11, 1917.
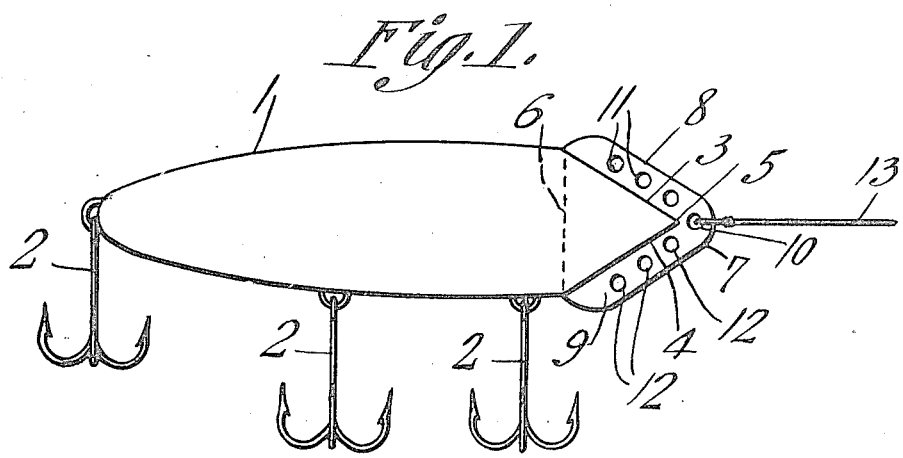
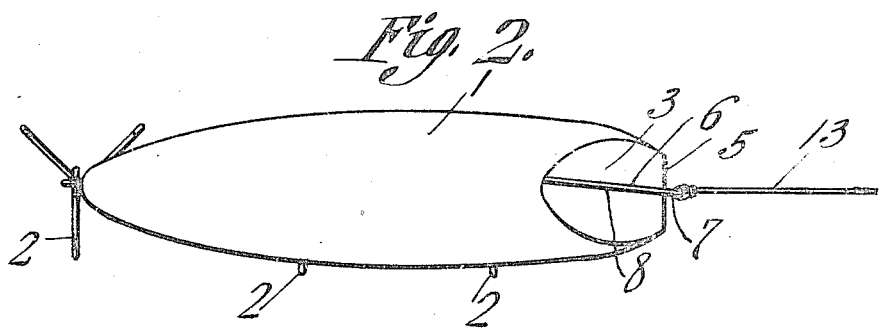
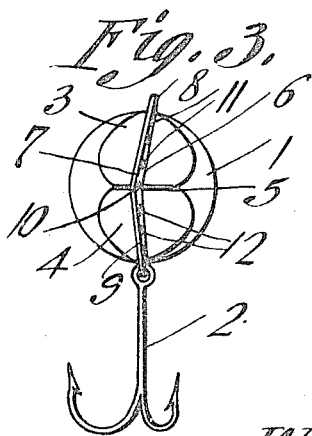
Witnesses
W. E. Phinney
Inventor
by
Attorneys

UNITED STATES PATENT OFFICE.

WILLIS E. PHINNEY, OF COLDWATER, MICHIGAN.

ARTIFICIAL BAIT.

1,239,956.  Specification of Letters Patent.  Patented Sept. 11, 1917.

Application filed September 7, 1916. Serial No. 118,898.

*To all whom it may concern:*

Be it known that I, WILLIS E. PHINNEY, a citizen of the United States, residing at Coldwater, in the county of Branch and State of Michigan, have invented a new and useful Artificial Bait, of which the following is a specification.

The present invention appertains to artificial bait, and relates more particularly to casting or trolling bait having means for controlling their movements when drawn through the water.

It is the object of the invention to provide a novel and improved bait of that character provided with simple and inexpensive yet thoroughly efficient means for causing the bait to dive to different depths or to skip over the water when drawn by the line, and for giving the bait a sidewise wiggling or tortuous movement to simulate the movement of a live bait when pursued.

A further object of the invention is the provision of an artificial bait, the body of which is provided with inclined planes at its forward end for causing the body to dive or skip, in connection with novel yet simple means applied to the forward end of the body for the attachment of the line at different points to control the depth to which the bait dives or the skipping motion of the bait when drawn in the water.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved bait.

Fig. 2 is a top plan view thereof.

Fig. 3 is a front end view.

In carrying out the invention, there is provided a body 1 constructed of wood or other buoyant material, and of fusi-form or other suitable contour, being suitably finished, and having hooks 2 connected thereto, for snagging or catching the fish attracted by the bait.

The bait 1 is provided with upper and lower rearwardly diverging inclined faces or planes 3 and 4, respectively, extending from the forward end or nose 5 of the body 1 to the upper and lower surfaces thereof. The forward end portion of the body 1 is also provided with a slot 6 disposed in a vertical plane arranged obliquely or at an acute angle with the axis of the body and located between the side edges of the faces 3 and 4. The slot 6 intersects the faces 3 and 4 and has fitted and secured therein a plate 7 of sheet metal or other material having a V-shaped portion projecting from the body to provide the rearwardly diverging upper and lower fins 8 and 9, respectively, projecting from the respective faces 3 and 4 substantially perpendicular or at right angles therewith. The plate 7 is disposed obliquely the same as the slot 6 and constitutes a flat piece of material which can be readily applied to the body with minimum work and expense. The plate 7 is provided at its forward end or corner with a line attaching aperture 10, and the upper inclined fin 8 has an inclined series of line attaching apertures 11, while the lower fin 9 is provided with a similar series of apertures 12. The upper and lower series of apertures diverge rearwardly from the aperture 10, and the series of apertures are substantially parallel with the respective faces 3 and 4. The apertures 10, 11 and 12 are for the attachment of the line 13 for pulling the bait through the water.

In use, when the line 13 is engaged through the aperture 10, the bait 1 when drawn through the water will have no great tendency to dive or rise, since the tendencies for the bait to dive and rise are neutralized by the action of the water against both faces 3 and 4. When the line 13 is engaged with one of the upper apertures 11, the upper face or plane 3 will receive the greatest impact of water thereagainst, and this will, due to the downward deflection of the forward end or nose of the bait, cause the bait to dive in the water. By engaging the line 13 with various apertures 11, the depth to which the bait dives can be regulated, in connection with the velocity at which the bait is drawn through the water. When the line 13 is engaged with one of the apertures 12, the lowermost face or plane 4 will receive the greatest impact of water thereagainst, thereby tending to raise the forward end or nose of the bait, which will cause the bait to skip over the water, and this skipping action can be controlled by engaging the line 13 with the various apertures 12. Thus, by simply applying the line 13 to the proper aperture, the bait can be made to move in the water as desired, and whenever it is drawn through the water, the oblique position of the plate 7 and its fins 8 and 9 serve to cause the body to move sidewise whereby it will wabble or simulate the movements of a live bait when pursued.

Having thus described the invention, what is claimed as new is:—

1. An artificial bait embodying a body having a plane inclined from its forward end, and a plate carried by the body providing a fin projecting from said plane, said fin having a series of line attaching means for the adjustable connection of a line to regulate the vertical movement of the body when drawn through the water, said fin being disposed obliquely of the body to create a sidewise motion of the body when drawn through the water.

2. An artificial bait embodying a body having upper and lower diverging inclined planes extending from its forward end, and a fin projecting from each of said planes, each of said fins having a series of line attaching means for the adjustable connection of a line to regulate the vertical movement of the body when drawn through the water, the line when attached to one fin causing the body to dive and when attached to the other fin causing the body to skip over the water.

3. An artificial bait embodying a body having an inclined face and an oblique slot at its forward end, and a plate fitted in said slot and providing a fin projecting from said face, said fin having a series of line attaching apertures.

4. An artificial bait embodying a body having upper and lower diverging faces and a slot at its forward end, and a plate fitted in said slot and providing fins projecting from said faces, said fins having a series of line attaching means.

5. An artificial bait embodying a body having inclined upper and lower diverging faces extending from its forward end, and a slot in its forward end portion arranged in an oblique vertical plane intersecting said faces, and a plate fitted in said slot and providing fins projecting from said faces, said fins having diverging series of apertures extending from the forward end of said plate for the attachment of a line.

6. An artificial bait embodying a body having a pair of diverging planes, and a plate attached to the body and providing fins projecting from said planes, said fins having diverging series of line attaching means.

In testimony that I claim the foregoing as my own, I have hereto affixed my signature in the presence of two witnesses.

WILLIS E. PHINNEY.

Witnesses:
ELLATHETA SPOFFORD,
NELLIE E. ADAMS.